3,254,132
Patented May 31, 1966

3,254,132
CYCLOTETRADECADIYNOLS
John H. Wotiz, Mentor, and William H. Pittman, Painesville, Ohio, assignors to Diamond Alkali Company, Cleveland, Ohio, a corporation of Delaware
No Drawing. Filed Sept. 7, 1960, Ser. No. 54,339
2 Claims. (Cl. 260—617)

This invention relates to novel cyclic polyacetylenic (polyyne) compounds, their preparation and use.

More particularly, this invention relates to compounds having the structure:

$$\left[\begin{array}{c}L\\|\\-C-\\|\\L'\end{array}\right]_e \begin{array}{c}(E)_{a+b}\\|\\-C-\\|\\(E')_a\end{array} (-)_a(=)_b(\equiv)_c \begin{array}{c}(G)_{a+b}\\|\\C-\\|\\(G')_a\end{array} \left[\begin{array}{c}J\\|\\-C-\\|\\J'\end{array}\right]_f -X_k$$

$$(R^1)_m$$

$$\left[\begin{array}{c}M\\|\\-C-\\|\\M'\end{array}\right]_g \begin{array}{c}(Q)_a\\|\\-C-\\|\\(Q')_{a+b}\end{array} (-)_a(=)_b(\equiv)_c \begin{array}{c}(R)_a\\|\\C-\\|\\(R')_{a+b}\end{array} \left[\begin{array}{c}T\\|\\-C-\\|\\T'\end{array}\right]_h$$

$$(R^2)_n$$

wherein $a$, $b$, $c$, $e$, $f$, $g$, and $h$, are each 0 or 1, but $a+b+c=1$; $k$ is 0 to 6, inclusive; $m$ and $n$ are numbers from 1 to 20, inclusive; X is halogen, i.e., fluorine, chlorine, bromine or iodine, chlorine being preferred at present; E, E′, G, G′, Q, Q′, R, R′, J, J′, L, L′, M, M′, T and T′ are selected from the group consisting of hydrogen, halogen and hydroxy, at least one of these elements being other than hydrogen if $a=1$, and $e$, $f$, $g$, and $h$ are 1; and $R^1$ and $R^2$ are the same or different radicals selected from the group consisting of alkylene radicals, e.g., radicals having the structure $—C_mH_{2m}—$ (and corresponding branched chain radicals), wherein $m$ is a number from 1 to 50; arylene radicals, e.g.,

[phenylene radicals: (alkyl)$_{1-4}$, halogen$_{1-4}$, 4-halogen]

[alkyl$_{1-4}$, halogen$_4$-alkyl]

as well as corresponding ortho and meta radicals; oxygen; sulfur;

$$-\overset{|}{N}-$$

mercury; boron; boron-containing radicals such as $$-\overset{H}{\underset{|}{B}}-, -\overset{alkyl}{\underset{|}{B}}-, -\overset{|}{B}-\text{[aryl: alkyl}_{0\text{ to }4}, \text{halogen}_{0\text{ to }4\text{-alkyl}}]$$

heterocyclic radicals such as

[furan, dioxane, thiophene, sulfone, piperidine rings]

aryl-substituted alkylene radicals, e.g., $$-\overset{H}{\underset{\text{Ph}}{C}}-, -\overset{H}{\underset{\text{Ph}}{C}}-C-, -\overset{|}{\underset{\text{Ph}}{C}}-$$

substituted alkylene radicals, e.g., $$-\overset{Cl}{\underset{Cl}{C}}-, -\overset{H}{\underset{O-\text{alkyl}}{C}}-, -\overset{O-\text{alkyl}}{\underset{O-\text{alkyl}}{C}}-, -\overset{H}{\underset{S-\text{alkyl}}{C}}-$$

tin; silicon;

$$-\overset{H}{\underset{H}{Si}}-; -\overset{\text{alkyl}}{\underset{H}{Si}}-; -\overset{\text{alkyl}}{\underset{\text{alkyl}}{Si}}-$$

—O—$M^3$—O— (wherein $M^3$ is selected from the group consisting of calcium, barium, zinc, tin, lead, $$-\overset{R^4}{\underset{R^4}{Si}}-$$

$$-\overset{R^4}{B}-, -\overset{R^4}{Al}-$$

$R^4$ being selected from the group consisting of hydrogen, lower alkyl, i.e., up to about 10 carbon atoms, or aryl radicals, e.g., phenyl or naphthyl).

In general, compounds of this invention can be prepared from cyclic polyynes such as those having the structure:

$$(CH_2)_{a'}]-[C\equiv C-(CH_2)_{e'}$$
$$(R^1)_{b'} \quad (R^2)_{f'}$$
$$(CH_2)_{c'}-C\equiv C]_{d'}-(CH_2)_{g'}$$

wherein $a'$, $c'$, $d'$, $e'$, and $g'$ are numbers from 0 to 20, inclusive; $b'$ and $f'$ are numbers from 0 to 2, inclusive; with the proviso that when $b'$ is 0 or 1, either $a'$ or $c'$ is equal to or greater than 3; and with the further proviso that when $f'$ is 0, the sum of $e'$ and $g'$ is equal to or greater than 3; and $R^1$ and $R^2$ are as defined hereinbefore.

Such cyclic compounds are disclosed in copending Ser. No. 831,930, filed August 6, 1959.

The terms "alkyl" and "alkylene," i.e., mono and divalent radicals, respectively, as used in the specification and claims, unless otherwise defined, are intended to refer to various monovalent straight chain, e.g., $CH_3(CH_2)_{a^1}$ groups, as well as branched chain derivatives thereof wherein $a^1$ is a number from 0 to 15; and to corresponding straight and branched chain divalent groups, e.g., $—(CH_2)_{b^1}$ wherein $b^1$ is a number from 1 to 50. The term "lower" used with either "alkyl" or "alkylene" is intended to refer to radicals containing up to 10 carbon atoms.

Specific examples of "alkyl" and "alkylene radicals" are those containing 2 to 5 carbon atoms, e.g.:

Alkylene
—CH$_2$—
—CH$_2$—CH$_2$—
—CH$_2$—CH$_2$—CH$_2$—
—CH$_2$—CH$_2$—CH$_2$—CH$_2$—
—CH$_2$—CH$_2$—CH$_2$—CH$_2$—CH$_2$—
—CH$_2$—CH$_2$—CH—CH$_2$—
              |
              CH$_3$
—CH$_2$—CH—CH$_2$—
         |
         CH$_3$
—CH$_2$—CH—CH—
         |    |
         CH$_3$ CH$_3$
—CH—CH—
  |    |
  CH$_3$ CH$_2$—CH$_3$
—CH$_2$—CH—CH$_2$—
         |
         CH$_2$—CH$_3$ Alkyl
CH$_3$—

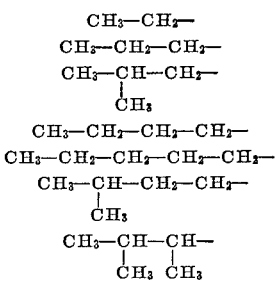

Compounds of this invention are useful in various applications, including pesticidal uses. As used in the specification and claims, the terms "pesticide," "pests," and "pesticidal" are intended to refer to the killing and/or controlling of the growth of plants, bacteria, microorganisms, fungi, or the like. Thus, it will be appreciated that applications commonly termed insecticidal, bactericidal, herbicidal, fungicidal, or the like, are contemplated. Other uses of compounds of this invention include applications as polymers, solid rocket fuel components, e.g., binders, as coatings, films, fibers, intermediates, high energy fuels, or fuel components, lubricating oil additives, corrosion inhibitors, rocket fuel starters, plasticizers, stabilizers, and the like.

More specifically, illustrative embodiments of this invention may be indicated as having subgeneric structural formulae corresponding to the manner in which they are derived from structure (I) as follows:

(A) Halogenation products:

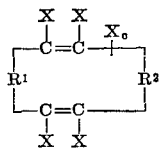

wherein X is hydrogen or halogen, i.e., fluorine, chlorine, bromine or iodine, chlorine being preferred, all X's not necessarily being the same and at least one X being halogen; $c$ is a number from 0 to 10, inclusive; and $R^1$ and $R^2$ are as defined hereinbefore but preferably alkylene.

Illustrative compounds of this type are the following:

1,1,2,2,8,8,9,9,x,x,x,x,x,x-tetradecachlorocyclotetradecane

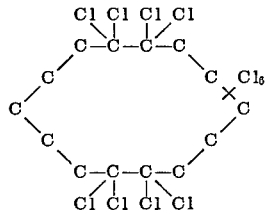

(all carbon valences being satisfied by C, H or Cl)

1,2,8,9,x,x,x-heptachloro-1,8-cyclotetradecadiene

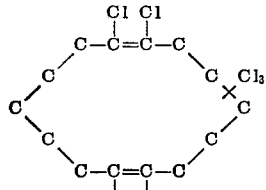

(all carbon valences being satisfied by C, H or Cl)

1,2,8,9,x-pentachloro-1,8-cyclotetradecadiene

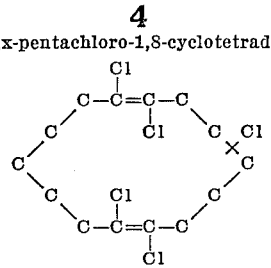

(all carbon valences being satisfied by C, H or Cl)

trans,trans-1,2,8,9-tetrabromo-1,8-cyclotetradecadiene

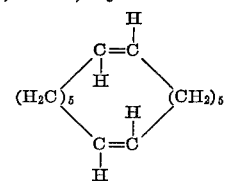

(B) Hydrogenation products:

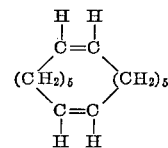

wherein $R^1$ and $R^2$ are as defined hereinbefore but preferably are alkylene.

Illustrative compounds of this type are the following:

trans,trans-1,8-cyclotetradecadiene

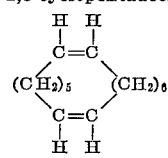

cis,cis-1,8-cyclotetradecadiene

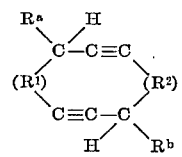

cis,cis-1,8-cyclopentadecadiene (C) Oxidation products:

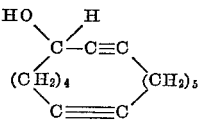

wherein $R^1$ and $R^2$ are as defined hereinbefore but preferably alkylene, and $R^a$ and $R^b$ are hydrogen or hydroxy, at least one of $R^a$ and $R^b$ being hydroxy.

Illustrative compounds of this type are the following:

2,9-cyclotetradecadiyne-1-ol 2,9-cyclotetradecadiyne-1,8-diol

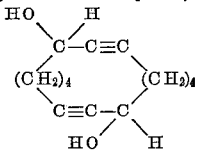

Illustrative of cyclic polyacetylenic compounds useful as starting materials for the production of compounds of this invention are the following:

1,7-cyclotridecadiyne

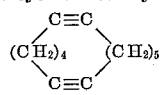

1,8-cyclotetradecadiyne

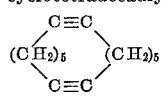

1,8-cyclopentadecadiyne

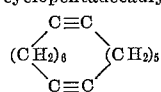

1,9-cyclohexadecadiyne

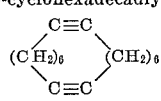

1,8,15-cycloheneicosatriyne

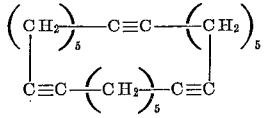

1,9,17-cyclotetracosatriyne

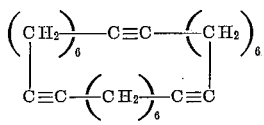

1,12-dioxa-6,17-cyclodocosadiyne

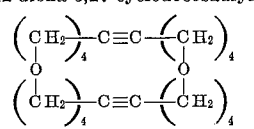

1,7,13,19-cyclotetracosatetrayne

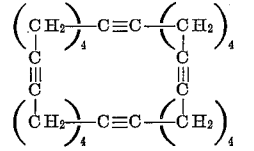

1,8-cyclohexadecadiyne

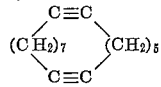

1,7-cyclododecadiyne

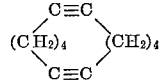

Preparation of the halogenated compounds of this invention can be accomplished by contacting the desired cyclic compound with a halogenating agent, until the desired amount of halogen is incorporated into the cyclic compound, under various conditions of temperature and with or without the presence of a catalyst such as $FeCl_3$ or $SbCl_5$ and/or U.V. irradiation or other source of radiation. The halogenating agent, preferably, although not necessarily, is an elemental halogen, i.e., fluorine, chlorine, bromine, or iodine. In many instances an inert solvent, preferably but not necessarily a non-halogenatable solvent such as a carbon tetrahalide, e.g., carbon tetrachloride is used. The temperature of halogenation can be varied from a low temperature dictated by the freezing point of the halogenating agent, e.g., about —80° C. when elemental chlorine (M.P. —101.6° C.) is used, in liquid form, to a higher temperature, e.g., about 200° C., generally dictated by the decomposition temperature of the reactants or products, it being recognized of course that for a given reaction, there will exist optimum halogenation conditions. In many instances, for example, it is advantageous to conduct the halogenation at the reflux temperature of the solvent employed. In general, when it is desired to halogenate the acetylenic bond, milder conditions can be employed, e.g., chlorination or bromination in the dark, at relatively low temperatures and in the presence of metal salts. On the other hand, addition chlorination or bromination generally does not require a catalyst. Purification of the halogenated products can be effected by distillation, recrystallization, e.g., from ethyl ether, or the like.

Oxidation products of this invention can be prepared by reacting a cyclic polyacetylenic compound with an oxidizing agent such as selenium dioxide, which is preferred, permanganic acid salts, e.g., potassium permanganate, dichromates, $CrO_3$, hypochlorous acid and its salts, chloric acid and chlorates, e.g., potassium chlorate, other metallic dioxides or peroxides such as $PbO_2$, $MnO_2$, $H_2O_2$, $Na_2O_2$, and $Ag_2O$ as well as oxygen or air. In general, it is convenient to carry out the oxidation, in a solvent, such as acetone, ethanol or other inert alkanol or hydrocarbon, typically at the reflux temperature of the solvent, although temperatures in the range from about 0° to 200° C. are feasible. The reaction conditions can, of course, be varied somewhat for a given combination of starting material and oxidizing agent. Hence, while the proportions of reactants can be varied, an excess of cyclic reactant over the oxidizing agent generally increases the yield of the monohydric cyclic product, e.g., molar ratios of cyclic reactant: oxidizing agent of about 1:1 to 5:1 or larger in some instances.

The preparation of hydrogenated compounds of this invention can be accomplished by hydrogenating a cyclic compound in the presence of a catalyst such as palladium oxide or platinum oxide, nickel, colloidal platinum or palladium, tungsten oxide ($W_2O_5$), molybdenum oxide ($Mo_2O_5$) or ($MoO_3$), aluminum oxide ($Al_2O_3$), thorium oxide ($ThO_2$), Adam's catalyst ($PtO_2$, Pt), nickel-copper, nickel-alumina, copper-zinc oxide, copper-chromium oxide, zinc oxide-chromium oxide, Lindlar's catalyst [$Pd/CaCO_3/Pb(OAc)_2$]. Lindlar's catalyst is a product which selectively promotes the hydrogenation (reduction) of a triple bond, —C≡C—, to a cis-double bond,

The procedure for the preparation of the catalyst is essentially that described by R. A. Raphael, in "Acetylenic Compounds in Organic Synthesis," Academic Press Inc., New York, New York, 1955, page 200.

Fifty grams of C.P. Grade $CaCO_3$ is suspended in 400 ml. of distilled water and a solution of 4.2 g. of $PdCl_2$ (anhydrous) in 45 ml. of water and 4 ml. of conc. HCl is added. The suspension is stirred for 5 minutes at 25° C. and for 10 minutes at 80° C. The hot suspension is transferred into a glass vessel attached to a Parr hydrogenator and compressed with 50 p.s.i.g. of $H_2$. After 5 minutes of shaking, the pressure ceases to drop noticeably, the hydrogen gas is vented, and the still-warm suspension is filtered. The solid is washed with four 100 ml. portions of water, suspended in 500 ml. of water, and a solution of 5 g. of lead acetate in 100 ml. of water is added. Stirring is continued for 10 minutes at 25° C. and then for 40 minutes on a steam bath. The suspension is cooled and the solid filtered off, washed with four 100 ml. portions of water and finally dried in vacuo at about 40° C. Alternately, hydrogenated compounds can be prepared by chemical reduction of sodium, lithium, or potassium with anhydrous ammonia, primary or secondary amines, diamines, and for alcohols at temperatures ranging from −33° C. to 100° C.

The reaction can be carried out by contacting with hydrogen the desired cyclic compound and catalyst at pressures ranging from atmospheric to about 1000 p.s.i.g. or higher in certain instances. The reaction temperature can be varied from about 0° to 200° C., preferably about 25° C.

It is convenient to dissolve the cyclic reactant in a solvent such as ethanol or other lower alkanol, acetic acid, ethyl acetate, ethyl ether, cyclohexane, dioxane or amines.

The hydrogenated product can be purified by recrystallization, or the like.

While compounds of this invention may be employed in a variety of applications, biologically active or otherwise, when employed as biologically active materials it will be understood, of course, that such compounds may be utilized in diverse formulations, both liquid and solid, including finely divided powders and granular materials as well as liquids such as solutions, concentrates, dispersions, emulsifiable concentrates, emulsions, slurries and the like, depending upon the application intended and the formulation medium desired.

These compounds may be used alone or in combination with other known biologically active materials such as other acetylenically unsaturated compounds, organic phosphate pesticides, fertilizers, chlorinated hydrocarbon insecticides, foliage and soil fungicides and the like.

Thus, it will be appreciated that compounds of this invention may be employed to form biologically active substances containing such compounds as essential active ingredients, which compositions may also include finely-divided dry or liquid carriers, extenders, fillers, conditioners, including various clays, such as talc, spent catalyst, alumina silica materials, liquids, solvents, diluents or the like, including water and various organic liquids such as benzene, toluene, chlorinated benzene, acetone, cyclohexanone, chlorinated xylene, carbon tetrachloride, ethylene dichloride, tetrachloroethylene, carbon disulfide, and alcohols at various temperatures thereof.

When liquid formulations are employed or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064). Other suitable surface active agents may be found in an article by John W. McCutcheon in Soap and Chemical Specialties, vol. 4, Nos. 7–10 (1955).

The term "carrier" as employed in the specification and claims is intended to refer broadly to materials constituting a major proportion of a biologically active or other formulation and hence, includes finely-divided materials, both liquids and solids, as aforementioned conveniently used in such applications.

In order that those skilled in the art may more completely understand the present invention and the preferred methods by which the same may be carried into effect, the following specific examples are offered:

*Example 1.—Preparation of 2,9-cyclotetradecadiyne-1-ol and 2,9-cyclotetradecadiyne-1,8-diol*

In a 3-liter, round-bottomed flask are placed 101.2 g. (.54 mole) of 1,8-cyclotetradecadiyne, 27.2 g. (.245 mole) of selenium dioxide, 50 ml. of water, and 1500 ml. of 95% ethanol. The flask is fitted with a reflux condenser, and the solution is boiled under reflux for 24 hours. The hot solution is decanted from the precipitated selenium and the solvent removed in a rotary evaporator. The solid residue is dissolved in acetone and chromatographed over alumina. There are obtained (crude) 8.40 g. (8.4%) of 2,9-cyclotetradecadiyne-1-ol [1] (M.P. 102° C. after recrystallization from $CCl_4$-hexane) and 26.45 g. (52.9%) of 2,9-cyclotetradecadiyne-1,8-diol [2] (M.P. 131° C. after recrystallization from benzene). In addition, 83.03 g. (crude) of 1,8-cyclotetradecadiyne is recovered.

*Example 2*

To illustrate the improved results obtained using an excess of cyclic polyyne over the oxidizing agent, the following experiments are conducted: To each of two mixtures of 250 ml. of 95% ethanol and 20 ml. of water, there is added 1,8-cyclotetradecadiyne and selenium dioxide in the proportions indicated in Table I. The mixtures are then refluxed and the resulting hot solutions decanted from the selenium and evaporated to dryness. The residue is dissolved in a minimum amount of acetone and chromatographed on an alumina column. The eluate fractions are evaporated to dryness and weighed, the following yield data being calculated from these weights of crude material.

TABLE I

| Reactant Molar Ratio (diyne : $SeO_2$) | Reflux time (hrs.) | Yield (percent) 2, 9-cyclotetradeca-diyne-1,8-diol |
|---|---|---|
| 1:1 | 23 | 56.2 |
| 3:1 | 48 | 92.0 |

*Example 3.—Preparation of trans, trans-1,2,9- tetrabromo-1,8-cyclotetradecadiene*

A reaction flask, previously swept with nitrogen, contains a solution of 18.8 g. (0.1 mole) of 1,8-cyclotetradecadiyne in 150 ml. of $CCl_4$. The flask is immersed into a cooling bath and the contents kept at −10° C. In order to keep the contents in the dark, the flask is wrapped in a black cloth. The reaction is carried out by a dropwise addition of 32 g. (0.2 mole) of $Br_2$ dissolved in 50 ml. of $CCl_4$. After the completion of addition, the temperature is permitted to rise from −10° C. to room temperature. There is evident a pale yellow solution in which white crystals are suspended. To remove and test for the presence of unreacted $Br_2$, nitrogen is passed through the products. The vent gases are passed through an aqueous solution of potassium iodide. The results of chemical analysis show that no $I_2$ is liberated by the passage of the vent gases through the KI solution.

To isolate the desired product, the $CCl_4$ is evaporated leaving 45.7 g. of semisolid. To purify the desired product, the semisolid is triturated with a mixture of ethyl ether and petroleum ether, leaving 24.2 g. (48% yield) of the desired product that melts at 197°–199° C. The re-

[1] Preparation of the indicated 2,9-cyclotetradecadiyne-1-ol is indicated by the following elemental analytical data:

| Element | Percent Actual | Percent Calculated |
|---|---|---|
| C | 81.9 | 82.3 |
| H | 9.2 | 9.9 |
| Molecular Weight | 199 | 204 |

[2] Preparation of the indicated 2,9-cyclotetradecadiyne-1,8-diol is indicated by the following elemental analytical data:

| Element | Percent Actual | Percent Calculated |
|---|---|---|
| C | 75.6 | 76.3 |
| H | 8.9 | 9.2 |
| Molecular Weight | 227 | 220 | sults of chemical analysis confirm the preparation of the desired product $C_{14}H_{20}Br_4$.

| Element | Actual percent by Weight | Calculated percent by Weight |
|---|---|---|
| C | 33.5 | 33.1 |
| H | 3.9 | 3.9 |

The experimentally determined molecular weight is 524 while the calculated molecular weight is 508. The infrared spectrum is consistent with the indicated structure.

*Example 4.*—Preparation of trans,trans-1,8-cyclotetradecadiene

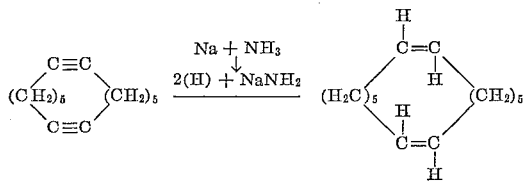

A one liter three-necked flask is fitted with a reflux condenser containing a Dry Ice-acetone mixture, a mechanical stirrer, and an addition funnel. The flask is thermally insulated by surrounding it with vermiculite. 800 ml. of anhydrous liquid ammonia (B.P. —33° C.) is placed in the flask and 11.5 g. (0.5 mole) of clean sodium is dissolved in the ammonia. A deep blue solution is formed to which is added dropwise a solution of 18.8 g. (0.1 mole) of 1,8-cyclotetradecadiyne in 125 ml. of anhydrous ethyl ether. The mixture is stirred until the blue color is discharged.

To isolate the desired product, the ammonia is evaporated and the residue treated with a mixture of 100 ml. of water and 100 ml. of ethyl ether. Two layers are formed. The desired product is in the upper layer which is separated, washed with two 50 ml. portions of water, and finally dried over Drierite. The ether is evaporated leaving behind the desired product as a white solid which is crystallized from hot ethanol. The desired product melts at 60°–61° C. The yield of crude material is 78% and of the pure product 62%. The results of chemical analysis indicate the formation of the desired $C_{14}H_{24}$.

| Element | Actual percent by Weight | Calculated percent by Weight |
|---|---|---|
| C | 87.8 | 87.5 |
| H | 12.0 | 12.5 |

The calculated molecular weight is 192 while the found molecular weight is 187. The infrared spectrum confirms the indicated structure. The presence of two double bonds in the product is also confirmed by a quantitative hydrogenation (using $PtO_2$ catalyst) to cyclotetradecane, M.P. 54°–55° C. In this hydrogenation 108% of theory for two double bonds is rapidly absorbed before the hydrogen uptake ceases.

*Example 5*

To illustrate the effectivenes of compounds of this invention as insecticides, leaves of Tendergreen bean plants are dipped into a test formulation [3] and after drying the leaves, one leaf is placed into each of two 5 oz. paper cups with ten randomly selected fourth instar larvae of the Mexican bean beetle (*Epilachna varivestis*). The cups are then covered and held at 70° F. for three days. The mortality for the indicated chemicals and concentrations are as follows:

| Test Compound | Concentration, percent | Percent Kill |
|---|---|---|
| 1,1,2,2,8,8,9,9,x,x,x,x,x,x-tetradecachlorocyclotetradecane | 0.1 | 100 |
| 1,2,8,9,x-pentachloro-1,8-cyclotetradecadiene | 0.1 | 60 |
| 1,2,8,9,x,x,x-heptachloro-1,8-cyclotetradecadiene | 0.05 | 100 |

*Example 6*

Several compounds of the invention are examined for their ability to inhibit the growth of the bacterial species *Erwinia amylovora*, *Xanthomonas phaseoli* and *Micrococcus pyrogenes* var. *aureus* at a concentration of 250 p.p.m. The formulation (0.1 g. test compound combined with 4 ml. of acetone and 2 ml. of solution of 0.5% by volume of Triton X-155 in water) is diluted without maintaining the concentration of the emulsifier or solvent. The bacteria are cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbimetric measurement. Each of three test tubes arranged in a rack receive one ml. of the 1250 p.p.m. test formulation. After the test formulations have been measured into a test tube 3½ ml. of distilled water and ½ ml. of bacterial suspension for each respective test organism is added to each test tube. The medication tubes are then set aside at room temperature for four hours. After this exposure period, transfers are made by means of a standard four mm. platinum loop to 7 ml. of sterile broth into test tubes arranged in racks similar to those for the medication tubes. The broth tubes are then incubated for 48 hours at 29° C. at which time growth is measured by use of a Bausch & Lomb Spectronic "20" direct reading colorimeter. A reading is recorded for each test tube after shaking. Three replicates of the organism serve as controls. Calculations are made on percent of the mean check readings. This figure subtracted from 100 gives percent control as compared to checks. The compound tested and the results are as follows:

| Test Compound | Bacterial Species | | |
|---|---|---|---|
| | E. a., percent Kill | X. p., percent Kill | S. a., percent Kill |
| 1,1,2,2,8,8,9,9,x,x,x,x,x,x-tetradecachlorocyclotetradecane | 82 | 78 | 79 |
| 1,2,8,9,x,x,x-heptachloro-1,8-cyclotetradecadiene | 67 | | |
| 2,9-cyclotetradecadiyne-1-ol | 60 | | |

*Example 7*

*Panagrellus redivivus* nematodes are exposed to 1,1,-2,2,8,8,9,9,x,x,x,x,x,x-tetradecachlorocyclotetradecane in watch glasses (27 mm. diam.—8 mm. deep) placed within a 9 cm. Petri dish. The glasses each receive 0.4 ml. of a test formulation.[4] 0.1 ml. of Panagrellus suspension is added to each glass thus bringing the concentration down to 1000 p.p.m. Each watch glass contains 30 to 40 nematodes. At the end of 48 hours, mortality counts are made. A 100% nematode kill at 100 p.p.m. is observed.

---

[3] 0.1 g. test compound+4 ml. acetone+2 ml. (0.5% by volume Triton X-155 in water)—dilute with distilled water to concentration of 2000 p.p.m.

[4] 0.1 g. test compound, 4 ml. acetone, 2 ml. stock emulsifier solution (0.5% Triton X-155 by volume) with sufficient distilled water added to obtain a total volume of 80 ml.

11
Example 8

Several compounds of the invention are tested against the fungi which incite the Early blight and Late blight diseases of plants using the following procedures:

A tomato foliage disease test is conducted measuring the ability of the test compound to protect tomato foliage against infection by the Early blight fungus *Alternaria solani*. Tomato plants 5 to 7 inches high of the variety Bonny Best are employed. The plants are sprayed with 100 ml. of test formulation at concentrations to give at least three finite values of disease control with 2000 p.p.m. and 400 p.p.m. of the test compound in combination with 5% acetone-0.01% Triton X–155-and the balance water at 40 lbs. air pressure while being rotated on a turntable in a spray hood. After the spray deposit is dry, the treated plants and comparable untreated controls are sprayed with a spore suspension containing approximately 20,000 conidia of *A. solani* per ml. The plants are held in a saturated atmosphere for 24 hours at 70° F. to permit spore germination and infection. After 2 to 4 days, lesion counts are made on the three uppermost fully expanded leaves. Percent disease control is then calculated by basing it on the number of lesions obtained on the control plants.

Fungicidal utility is demonstrated by the ability of the test compound to protect tomato plants against the Late blight fungus, *Phytophthora infestans*, by the identical procedure, except that after the spray deposit is dry, the treated plants and comparable untreated controls are sprayed with approximately 150,000 sporangia of *P. infestans* per ml. The plants are held in a saturated atmosphere for 24 hours at 60° F. to permit spore germination and infection. After 2 to 4 days, lesion counts are made on the three uppermost fully expanded leaves and percent disease control is calculated.

The results of these tests are as follows:

| Test Compound | % Disease Control | |
|---|---|---|
| | Early Blight | Late Blight |
| 2,9-cyclotetradecadiyne-1-ol | 97.6 at 0.1% | 64 at 0.1%. |
| 2,9-cyclotetradecadiyne-1,x-diol | | 83 at 0.1%. |

Example 9

Bean plants, variety Tendergreen, just as the trifloliate leaves are beginning to unfold, are sprayed with a test formulation at a concentration of 2400 p.p.m. (0.48%) or about four pounds active chemical per 100 gallons of water. Four test plants are all sprayed simultaneously with 80 ml. of the test formulation [5] at 40 pounds per square inch while being rotated on a turntable in a spray hood. After the plants are dry, they are removed to the greenhouse. Records are taken 14 days after treatment, at which time the treated plants are dead. Similar results are obtained in a soil watering test at 64 lbs./acre.

Example 10

Composed greenhouse soil diluted by one-third with clean, washed sand is placed in one-half gallon glazed crocks and infested with three to five grams of knotted or galled tomato roots (source of root-knot nematodes—*Meloidogyne sp.*). Treatment is accomplished by mixing trans,trans-1,8-cyclotetradecadiene intimately with the soil. After treatment, the crocks are covered and stored at 20° C. Seven days after treatment, three seedling Bonny Best tomatoes are transplanted into each crock. After three weeks in the greenhouse, the plants are removed and the roots inspected for nematode galls. It

[5] 384 mg. trans,trans-1,2,8,9-tetrabromo - 1,8 - cyclotetradecadiene combined with 10 ml. cyclohexanone, 8 ml. of Triton X–155 solution (0.5% by volume Triton X–155 balance water) and 62 ml. distilled water.

12 is observed that a 40% control is obtained as compared to untreated check plants.

Example 11.—Preparation of cis,cis-1,8-cyclotetradecadiene

One g. of Lindlar's catalyst is added to a solution of 20 g. (0.11 mole) of 1,8-cyclotetradecadiyne in 150 ml. of ethyl acetate, in a pressure bottle attached to a Parr hydrogenator, and pressurized with 50 p.s.i.g. of $H_2$. Agitation is started which results in an immediate drop in the hydrogen pressure. In 30 minutes the pressure drop ceases. The uptake of $H_2$ is 17 p.s.i.g. corresponding to a consumption of 0.21 mole of hydrogen. The gas is vented and the solution filtered to remove the catalyst. The filtrate is evaporated to dryness leaving 18.1 g. of a residue which after two crystallizations from hot methanol weighs 8.4 g. (41% yield) and melts at 48°–49° C.

The results of chemical analysis confirms the presence of the desired $C_{14}H_{24}$.

| Element | Actual Percent by Weight | Calculated Percent by Weight |
|---|---|---|
| C | 86.8 | 87.4 |
| H | 12.5 | 12.6 |

The experimentally found molecular weight is 173 whereas the calculated is 192. The result of the infrared spectroscopic analysis confirms the indicated structure.

Example 12.—Preparation of cis,cis-1,8-cyclopentadecadiene

One gram of Lindlar's catalyst is added to a solution of 20 g. (0.1 mole) of 1,8-cyclopentadecadiyne in 150 ml. of ethyl acetate in a pressure bottle attached to a Parr hydrogenator, and pressurized with 50 p.s.i.g. of $H_2$. Agitation is started which results in an immediate loss of the hydrogen pressure. In 30 minutes, the drop in $H_2$ pressure ceases. There is a decrease of 16 p.s.i.g. of $H_2$ which corresponds to a 0.2 mole consumption of $H_2$. The gas is vented, the solution filtered to remove the catalyst and the solvent evaporated from the filtrate. The residue is a liquid which is purified by distillation. The desired product boils at 89°–90° C. at 0.05 mm. Hg. The yield is 16.3 g., 80% of theory. The results of chemical analysis confirm formation of the desired $C_{15}H_{26}$.

| Element | Actual Percent by Weight | Calculated Percent by Weight |
|---|---|---|
| C | 87.3 | 87.3 |
| H | 12.5 | 12.7 |

The experimentally found molecular weight is 187 whereas the calculated molecular weight is 206. The infrared spectrum analysis confirms the indicated structure.

Example 13.—The chlorination of 1,8- cyclotetradecadiyne to $C_{14}H_{20}Cl_5$ A solution of 10 g. (0.053 mole) of 1,8-cyclotetradecadiyne in 50 ml. of $CCl_4$ is kept in the dark by wrapping the flask with a black cloth. The solution is kept at −20° to −40° C. by immersing the flask in a Dry Ice-acetone coolant. A solution of 7.5 g. (0.106 mole) of chlorine in 100 ml. of $CCl_4$ is added dropwise over a period of 45 minutes. After stirring the product for an additional 15 minutes, dry nitrogen gas is passed through the solution for 30 minutes to sweep out any unreacted $Cl_2$ and formed HCl. Analysis of the gas indicates that 0.0008 mole of $Cl_2$ is recovered and 0.0290 mole of HCl is formed. This indicates that 0.076 mole of chlorine reacts by addition to the triple bond.

Further chlorination is carried out by the addition of 7.5 g. (0.106 mole) of $Cl_2$ in 100 ml. of $CCl_4$ at −20° to −40° C. After 45 minutes, the reactor is again purged with dry nitrogen and the gases analyzed. From the second chlorine addition, 0.0861 mole of $Cl_2$ is recovered, 0.0158 mole of HCl is found which indicates that 0.004 mole of chlorine reacts by addition to the triple bond. Thus, the total addition of 0.212 mole of $Cl_2$ results in recovery of 0.0862 mole of $Cl_2$, 0.0448 mole of HCl is formed and 0.080 mole of $Cl_2$ reacted by addition to the triple bond.

To isolate the chlorinated product, the $CCl_4$ solution is evaporated to dryness leaving 15.5 g. of a cream-colored oil which is identified as $C_{14}H_{20}Cl_5$. The results of chemical analysis are as follows:

| Element | Actual Percent by Weight | Calculated Percent by Weight |
|---|---|---|
| C | 43.3 | 46.0 |
| H | 5.3 | 5.4 |
| Cl | 50.0 | 48.7 |

The found molecular weight is 323 whereas calculated for $C_{14}H_{20}Cl_5$ is 365. The compound is insoluble in water but soluble in acetone, cyclohexanone, xylene and other organic solvents. The compound deteriorates on standing at room temperature and liberates HCl.

*Example 14.—The chlorination of 1,8-cyclotetradecadiyne to $C_{14}H_{17}Cl_7$*

A reactor fitted with a reflux condensor containing a Dry Ice-acetone mixture is immersed in a Dry Ice-acetone cooling bath (−78° C.). The reactor contains 5.0 g. (0.0266 mole) of 1,8-cyclotetradecadiyne and 100 ml. of liquid chlorine. After one hour of contact time, the temperature is gradually raised to 25° C. and the unreacted chlorine is boiled off leaving a yellow oil. In order to remove the last traces of unreacted $Cl_2$ and formed HCl, suction is applied which causes foaming of the product, and the formation of 10 g. of a brittle, light yellow, solid, M.P. 55°–7° C. The results of chemical analysis indicate the formation of the desired $C_{14}H_{17}Cl_7$.

| Element | Actual Percent by Weight | Calculated Percent by Weight |
|---|---|---|
| C | 38.9 | 38.8 |
| H | 3.6 | 3.9 |
| Cl | 57.0 | 57.4 |

The found molecular weight is 413 whereas the calculated molecular weight is 433. The result of infrared analysis shows that the product does not have any triple bonds but that double bonds are present.

*Example 15.—The chlorination of 1,8-cyclotetradecadiyne to $C_{14}H_{14}Cl_{14}$*

A solution of 18.8 g. (0.1 mole) of 1,8-cyclotetradecadiyne in 300 ml. of $CCl_4$ is chlorinated in stages by passing a stream of chlorine (0.3 mole per hour) through the solution. The first stage chlorination is accomplished by passing the $Cl_2$ through for four hours at room temperature. The second stage chlorination is carried out by passing the $Cl_2$ through for 2 hours while the $CCl_4$ solution at room temperature is irradiated with U.V. light from a Hanovia light source. The final chlorination stage comprises passing $Cl_2$ through the $CCl_4$ solution at its boiling point while subjected to U.V. light irradiation for 252 hours.

The product of chlorination is isolated by evaporation of the $CCl_4$ which leaves 61.7 g. of a yellow oil. In order to remove the last trace of $Cl_2$, HCl, and $CCl_4$, suction is applied which causes foaming of the oil and the formation of a porous solid. This solid is further purified by crystallization from ethyl ether which produces a soft, yellow powder, M.P. 79°–81° C. The results of chemical analysis indicate the formation of $C_{14}H_{14}Cl_{14}$.

| Element | Actual Percent by Weight | Calculated Percent by Weight |
|---|---|---|
| C | 24.0 | 23.8 |
| H | 1.5 | 2.0 |
| Cl | 70.5 | 73.2 |

It is to be understood that although the invention has been described with specific reference to particular embodiments thereof, it is not to be so limited, since changes and alterations therein may be made which are within the full intended scope of this invention as defined by the appended claims.

What is claimed is:
1. 2,9-cyclotetradecadiyne-1-ol.
2. 2,9-cyclotetradecadiyne-1,8-diol.

References Cited by the Examiner

Eglinton et al., Chem. Abstract, vol. 53 (1959), page 17960.

Sondheimer et al., Jour. Amer. Chem. Soc., vol. 81 (1959), pages 1771–1772 (2 pages).

LEON ZITVER, *Primary Examiner.*

CHARLES B. PARKER, *Examiner.*